UNITED STATES PATENT OFFICE.

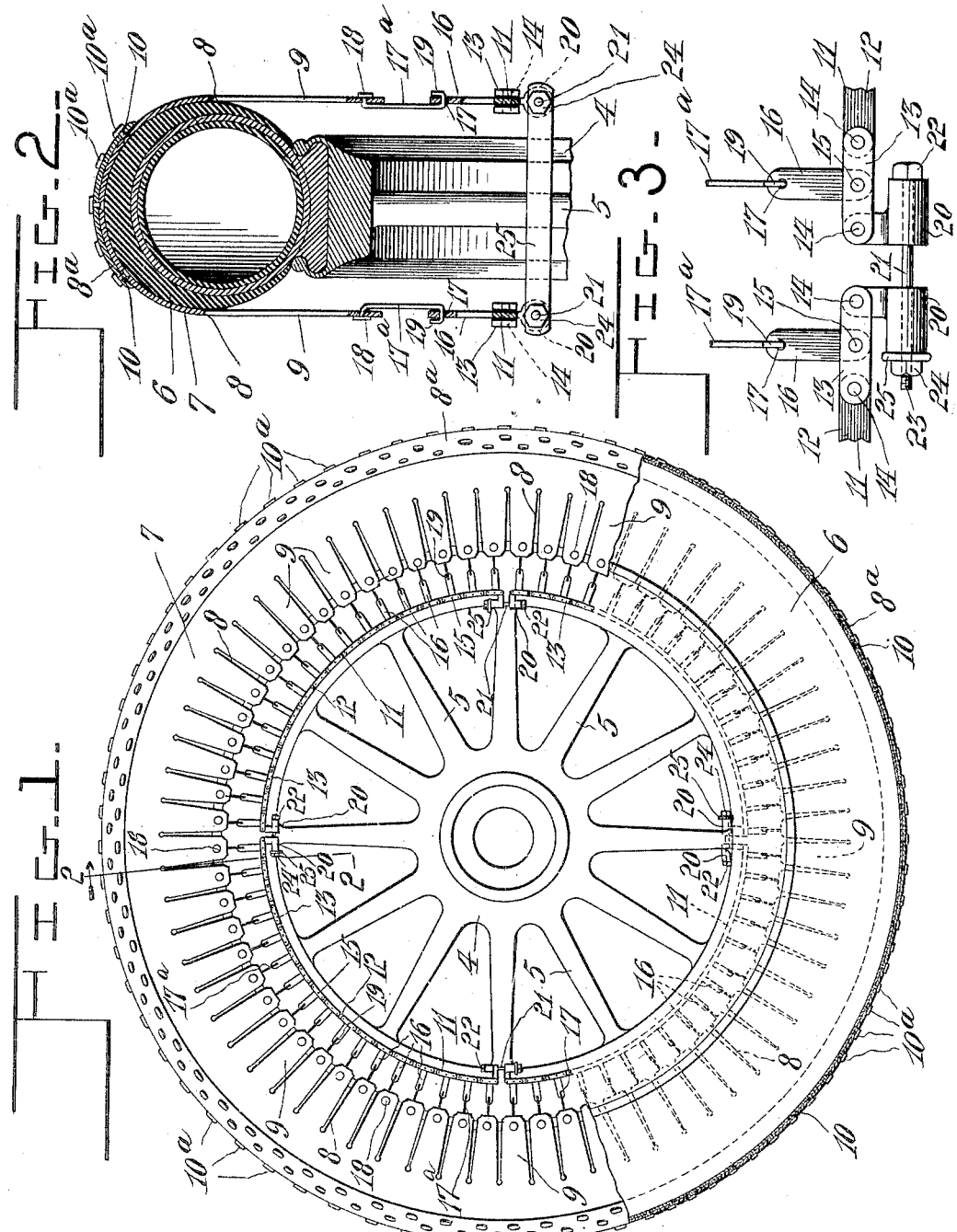

PIERRE OMER CASAVANT, OF POINT ST. CHARLES, CANADA.

PNEUMATIC-TIRE PROTECTOR.

No. 802,735.            Specification of Letters Patent.            Patented Oct. 24, 1905.

Application filed October 26, 1904. Serial No. 230,007.

*To all whom it may concern:*

Be it known that I, PIERRE OMER CASAVANT, a subject of the King of Great Britain, residing at Point St. Charles, county of Hochelaga, in the Province of Quebec, Canada, have invented certain new and useful Improvements in Pneumatic-Tire Protectors; and I do hereby declare that the following is a full, clear, and exact description of the invention, such as will enable others skilled in the art to which it appertains to make and use the same.

The object of this invention is to provide an inflatable tire for vehicles with a novel protective armor which is light, strong, and durable, which will afford increased bite or frictional contact with a road-bed, thus preventing slipping of the wheels provided with the improvement, and which is adapted for use on automobiles, road-wagons, carriages, or bicycles.

The invention consists in the novel construction and combination of parts, as is hereinafter described, and particularly pointed out in the claims.

Reference is had to the accompanying drawings, forming a part of this application, in which similar numerals of reference indicate corresponding parts in all the views, and in which—

Figure 1 is a side elevational view of an automobile-tire equipped with the invention. Fig. 2 is a sectional view taken approximately on line 2 2 of Fig. 1 looking in the direction of the arrow, and Fig. 3 is a detached detail view of the take-up means hereinafter referred to.

Referring to the parts, 4 is an automobile-wheel having the spokes 5, &c., and provided with any style of inflatable tire 6, the tire not forming any part of the present invention. Approximately surrounding the exposed portion of the tire is a cover or sheathing 7, which is preferably formed of some suitable flexible material, which is serrated radially at 8, whereby lips 9 are provided formed preferably integral with the said sheathing 7 and projecting therefrom in a direction toward the wheel-hub, as shown. Connected with the cover or sheathing 7 is an armor $8^a$, which may be formed of metal or of leather or other suitable flexible material, as may be found most convenient. Uniting the sheathing 7 and armor $8^a$ are studs or rivets 10, which have the enlarged head portions $10^a$, as shown, which head portions assist in gripping the road-surface to prevent slipping of the wheel upon which the device is secured. This armor extends entirely around the circumference of the wheel outside of the cover or sheathing 7. Extending circumferentially of the wheel there are provided four or more sections of chain 11, which chain is formed of links 12 and 13, as best shown in the fragmentary view, Fig. 3, said links being pivotally connected by means of pins 14, passing transversely through said links. The links of the chain are perforated intermediate the ends thereof, and passing through the perforations are rivets 15, which connect radially-extending links 16 with said chain. These radially-extending links are perforated at 17—that is, near the ends thereof away from said chain and in proximity to the inner ends of the lips 9.

The lips 9 are perforated, and passing through the perforations in said lips and the perforations in said radially-extending links are hooks $17^a$, which hooks are preferably formed with the enlarged head portions 18 at one end and the angular engaging hook 19 at the opposite end thereof to connect the chain-sections 11 with the lips of said sheathing or cover. Connected to the sections 11 of said sprocket-chain are perforated take-up lugs 20, which are provided with longitudinal perforations, through which pass the connecting and adjusting bolts 21, which bolts are provided at one end with the heads 22 and at the opposite end with the screw-threaded portions 23, upon which are screwed the nuts 24 to take up any slack which may develop in the said chain-sections 11.

As will be seen in Fig. 2, the chain-sections 11 are provided at each side of the wheel, and connecting-bars 25 extend transversely of the wheel in proximity to the spokes 5, where said connecting-bars are supported upon the take-up bolts 21. The bars 25 are placed in such convenient proximity to the spokes 5 that they materially assist to prevent "creeping" of the sheathing and armor upon the wheel-tire, which creeping tends to injuriously affect the tire.

By reason of the fact that the chains 11 are formed of separate links which are pivotally connected a great degree of flexibility in the parts is provided, which will permit the device to accommodate itself to any irregularities in the surface of the road, and this flexibility of the chain-sections 11 assists materially in adjusting and tensioning said chain by means of the lugs 20 referred to.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. In a protecting device for pneumatic tires, a serrated sheathing having radial, integral, lips, a chain approximately concentric with the inner ends of said lips, radial links connected with said chain, and means for connecting said lips with said radial links.

2. In a protecting device for pneumatic tires, a sheathing, an armor-plate thereon, rivets connecting said armor-plate with the sheathing, a chain comprising a plurality of sections, means connecting the links of said chain with said sheathing, and adjusting means connecting the sections of said chain.

3. In a protecting device for pneumatic tires, a sheathing, radial lips integral therewith, an armor-plate thereon, rivets connecting said armor-plate with the sheathing, a chain comprising a plurality of sections, means connecting the links of said chain with said sheathing, and adjusting means connecting the sections of said chain.

4. In a protecting device for the tire of a vehicle-wheel, a sheathing adapted to partly inclose the tire of said wheel, an armor-plate connected exteriorly of said sheathing, rivets with enlarged heads serving as the connecting means therefor, lips extending inwardly of the sheathing, hooks engaging said lips, chains connected with said hooks, and transversely-extending bars connecting said chains.

5. In a protecting device for the tire of a vehicle-wheel, a sheathing adapted to partly inclose the tire of said wheel, an armor-plate connected exteriorly of said sheathing, rivets with enlarged heads serving as the connecting means therefor, lips extending inwardly of the sheathing, hooks engaging said lips, chains connected with said hooks, transversely-extending bars connecting said chains, perforated depending lugs connected with the end portions of said chains, and means extending through said lugs adapted to regulate the tension of said chains.

6. In a device of the character described, a spoked wheel, a pneumatic tire thereon, a serrated shield upon said tire, an armor secured upon the exterior of said shield, flexible chain-sections, radially-extending links and hooks connecting said chain-sections and with said shield, perforated lugs connected with the end portions of said chains, bolts passing through said lugs, and cross-bars supported by said bolts.

In witness whereof I have hereunto set my hand in the presence of two witnesses.

PIERRE OMER CASAVANT.

Witnesses:
 T. MYNARD,
 V. COCHUE.